United States Patent
Arel et al.

(10) Patent No.: US 8,439,640 B2
(45) Date of Patent: May 14, 2013

(54) PROPELLER BLADE PITCH CONTROL SYSTEM

(75) Inventors: David V. Arel, Richmond, VA (US); Robert H. Perkinson, Somers, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 816 days.

(21) Appl. No.: 12/464,930

(22) Filed: May 13, 2009

(65) Prior Publication Data
US 2010/0014976 A1    Jan. 21, 2010

Related U.S. Application Data

(60) Provisional application No. 61/134,897, filed on Jul. 15, 2008.

(51) Int. Cl.
*B63H 3/00* (2006.01)
(52) U.S. Cl.
USPC ......... 416/117; 416/119; 416/157 R; 416/165
(58) Field of Classification Search .................. 416/117, 416/119, 157 R, 165
See application file for complete search history.

(56) References Cited

U.S. PATENT DOCUMENTS

| | | | |
|---|---|---|---|
| 3,212,586 A | | 10/1965 | Barnes et al. |
| 4,523,891 A | * | 6/1985 | Schwartz et al. ......... 416/157 R |
| 4,591,313 A | | 5/1986 | Miyatake et al. |
| 4,890,979 A | | 1/1990 | Ames et al. |
| 5,897,293 A | * | 4/1999 | Arel et al. ...................... 416/46 |
| 5,997,250 A | | 12/1999 | Carter, Jr. et al. |
| 6,077,040 A | | 6/2000 | Pruden et al. |
| 6,425,788 B1 | * | 7/2002 | Lindholm ...................... 440/50 |
| 6,511,292 B2 | | 1/2003 | Perkinson et al. |
| 6,811,376 B2 | | 11/2004 | Arel et al. |
| 6,981,844 B2 | * | 1/2006 | Perkinson et al. ................. 416/1 |
| 7,296,969 B2 | | 11/2007 | Raes et al. |
| 7,758,310 B2 | * | 7/2010 | Cotton et al. ............ 416/157 R |
| 7,976,279 B2 | * | 7/2011 | Raes et al. ................. 416/157 B |
| 2010/0007151 A1 | * | 1/2010 | Ciszak et al. ................... 290/55 |

FOREIGN PATENT DOCUMENTS

| | | |
|---|---|---|
| GB | 553902 | 5/1941 |
| GB | 2071779 | 9/1981 |
| WO | 8602901 | 5/1986 |

OTHER PUBLICATIONS

International Search Report dated Oct. 8, 2009.

* cited by examiner

*Primary Examiner* — Matthew W Such
*Assistant Examiner* — David Spalla
(74) *Attorney, Agent, or Firm* — Carlson, Gaskey & Olds, P.C.

(57) ABSTRACT

A propeller blade pitch control system includes a propeller hub for mounting at least one propeller blade, and a propeller shaft which rotates about an axis to rotationally drive the propeller hub. A pitch change yoke located within the propeller hub is configured to change a pitch of the at least one propeller blade in response to hydraulic fluid flow to a pitch change actuator. A propeller gearbox includes a first, rear end and a second, forward end located between the first, rear end and the pitch change yoke, and is configured to apply torque to the propeller hub. A hydraulic transfer bearing located between the first, rear end and the second, forward end of the propeller gearbox is operable to selectively permit a flow of hydraulic fluid from at least one hydraulic flow controller to the pitch change actuator.

23 Claims, 3 Drawing Sheets

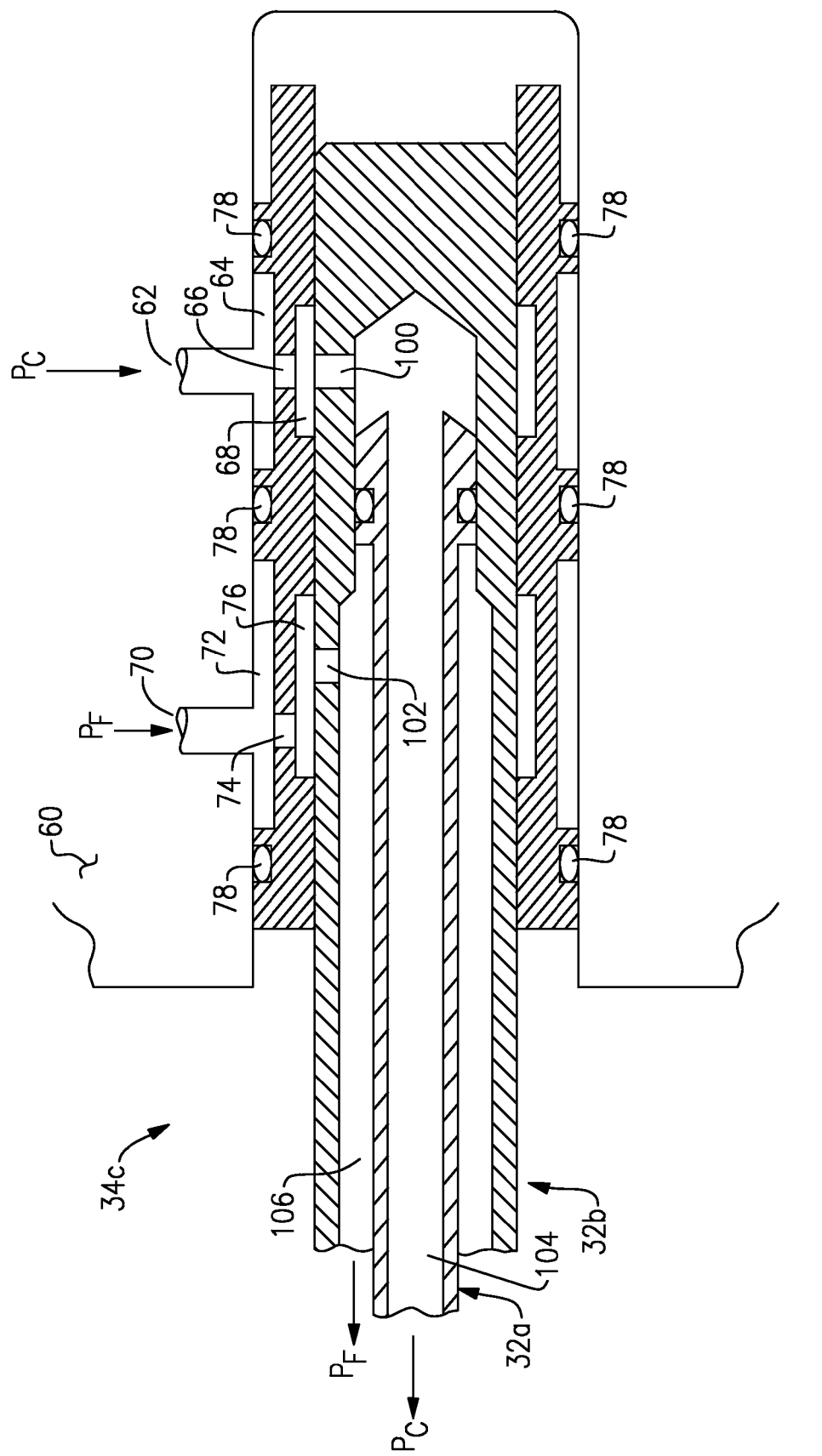

PROPELLER BLADE PITCH CONTROL SYSTEM

The application claims priority to U.S. Provisional Application No. 61/134,897 which was filed on Jul. 15, 2008.

BACKGROUND OF THE INVENTION

This application relates to an aircraft control system, and more particularly to a system for controlling a pitch of a propeller blade.

Turboprop engines use a gas turbine to drive a propeller. Some turboprop engines include pitch control functionality that alters a pitch of a propeller blade to maintain a desired rotational speed. In some systems hydraulic fluid is transmitted through a hydraulic transfer bearing assembly to effect pitch change. Previous pitch control systems include a transfer bearing assembly and associated control components located in an envelope volume behind a propeller gearbox.

SUMMARY OF THE INVENTION

A propeller blade pitch control system includes a propeller hub for mounting at least one propeller blade, and a propeller shaft which rotates about an axis to rotationally drive the propeller hub. A pitch change yoke located within the propeller hub is configured to change a pitch of the at least one propeller blade in response to hydraulic fluid flow to a pitch change actuator. A propeller gearbox includes a first, rear end and a second, forward end located between the first, rear end and the pitch change yoke, and is configured to apply torque to the propeller hub. A hydraulic transfer bearing located between the first, rear end and the second, forward end of the propeller gearbox is operable to selectively permit a flow of hydraulic fluid from at least one hydraulic flow controller to the pitch change actuator.

These and other features of the present invention can be best understood from the following specification and drawings, the following of which is a brief description.

BRIEF DESCRIPTION OF THE DRAWINGS

FIG. 1b illustrates an example hydraulic transfer bearing assembly.

DETAILED DESCRIPTION OF THE EMBODIMENTS

Figures 1, 1A:
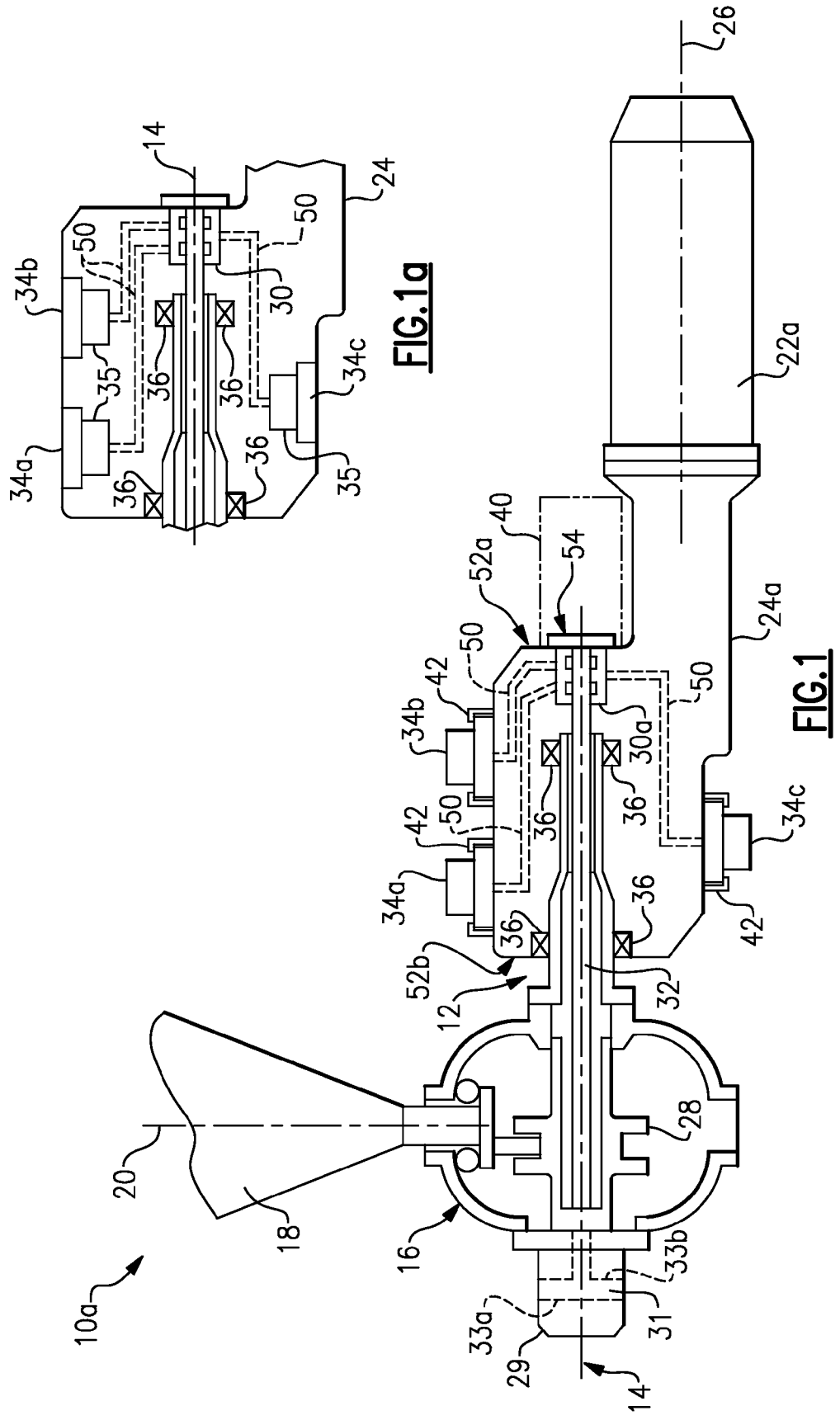
FIG. 1 schematically illustrates a first propeller blade pitch control system including a radially offset propeller gearbox.
FIG. 1a schematically illustrates an alternate hydraulic fluid controller configuration for the system of FIG. 1.

FIG. 1 schematically illustrates a first propeller blade pitch control system 10a. A propeller shaft 12 rotates about a first axis 14 to drive a propeller hub 16 and its associated at least one propeller blade 18. The propeller blade 18 extends radially from the propeller hub 16 along a second axis 20 that is generally perpendicular to the first axis 14. Although only one propeller blade 18 is shown, it is understood that a plurality of propeller blades could be attached to the propeller hub 16, and could extend radially along other axes that are also generally perpendicular to the first axis 14.

A gas turbine engine 22a drives the rotation of the propeller hub 16, and a radially offset propeller gearbox 24a is operable to apply torque to the propeller hub 16 from the engine 22.

The gearbox 24a is radially offset in that it extends along a third, different axis 26 that is generally parallel to the first axis 14. The gearbox 24a includes a first, rear end 52a and a second, forward end 52b.

A pitch change yoke 28 may be moved along the first axis 14 to change a pitch of the at least one propeller blade 18. A hydraulic transfer bearing 30a is configured to selectively permit a flow of hydraulic fluid from a plurality of stationary hydraulic fluid controllers 34a-c along a transfer tube 32 to a hydraulic actuator piston 31 to move the rotating pitch change yoke 28. The transfer bearing 30a is located at the first, rear end 52a of an interior of the propeller gearbox 24a, and may be accessible from a removable cover 54 on the first, rear end 52a of the propeller gearbox 24a. The transfer bearing 30a may also be accessible from the interior of the gearbox.

The hydraulic fluid moves the pitch change yoke 28 by applying pressure to either side of the hydraulic actuator piston 31, which is located within a pitch change actuator 29. The pitch change yoke 28 is attached to and movable by the hydraulic actuator piston 31. The transfer tube 32 is concentrically located within the propeller shaft 12, along the first axis 14. Both the transfer bearing 30 and the transfer tube 32 are configured to co-rotate with the propeller shaft 12 and pitch change yoke 28. Bearings 36 assist in the rotation of the propeller shaft 12 and transfer tube 32.

The plurality of hydraulic fluid controllers 34a-c communicate hydraulic fluid to the transfer bearing 30a along plumbing channels 50, and control the flow of hydraulic fluid through the transfer bearing 30a. The hydraulic fluid controllers 34a-c could include, for example, a main pump, an auxiliary pump, a propeller control, and a protection unit. The pump would be operable to supply pressure for application to the pitch change actuator 31. The propeller control would be operable to accept inputs from a pilot and direct hydraulic fluid to the pitch change actuator 29 to change pitch in response to the pilot inputs. The protection system would be operable to accept electrical inputs from sensors or from an aircraft airframe and provide overspeed protection and low pitch stop protection in response to the inputs. The propeller control could include, for example, a servo valve, one or more solenoid valves, rotational speed sensors or blade angle positional sensors. Of course, other types and quantities of control components could be used.

As shown in FIG. 1, the control components 34a-c are individually housed, and are connected to an exterior surface of the propeller gearbox 24 via a flange connection 42. However, as shown in FIG. 1a, it would also be possible for the control components 34a-c to be located in a plurality of cavities 35 within the propeller gearbox 24.

FIG. 1b illustrates an example hydraulic transfer bearing 34c assembly. A control housing 60 encloses a portion of the transfer bearing 34c. The housing could correspond to a gearbox, for example. An inner transfer tube 32a is operable to communicate hydraulic fluid to increase pitch pressure (i.e. move pitch change yoke 28 towards the transfer bearing) by applying hydraulic fluid to a first side 33a of the hydraulic actuator piston 31. An outer transfer tube 32b is operable to communicate hydraulic fluid to decrease pitch pressure (i.e. move pitch change yoke 28 away from the transfer bearing) by applying hydraulic fluid to a second side 33b of the hydraulic actuator piston 31.

The transfer bearing 34c includes two passages 62, 70. In one example, the passages 62, 70 are drilled or cast into the housing 60. Using passage 62 as an example, hydraulic fluid moves through the passage 62 in the housing 60 so that fluid ("$P_C$") may flow into an outer annulus 64, through a hole 66 into inner annulus 68, through a hole 100 in tube 32b, where it may pass through the interior 104 of tube 32a to the pitch change actuator 29.

Using passage 70 as an example, hydraulic fluid moves through the passage 70 in the housing 60 so that fluid ("$P_F$") may flow into an outer annulus 72, through a hole 74 into inner annulus 76, through a hole 102 in tube 32b, where it may pass through the annular cavity 106 defined by the interior of tube 32b and the exterior of tube 32a to the pitch change actuator 29.

Although only a single hole is shown for each of reference numerals 100, 102, it is understood that the transfer bearing 34c could include a plurality of holes 100, 102 spaced along an outer circumference of the pitch change tube 33b. A plurality of o-ring seals 78 provide a pressure seal between the outer transfer tube 32b and the housing 60. As indicated earlier, shafts 32a-b rotate together with the at least one propeller blade 18 while the transfer bearing 34c remains stationary. The close fit between shaft 32b and the interior of transfer bearing 34c provides a rotating seal between the various pressures $P_C$, $P_F$.

Figure 2:
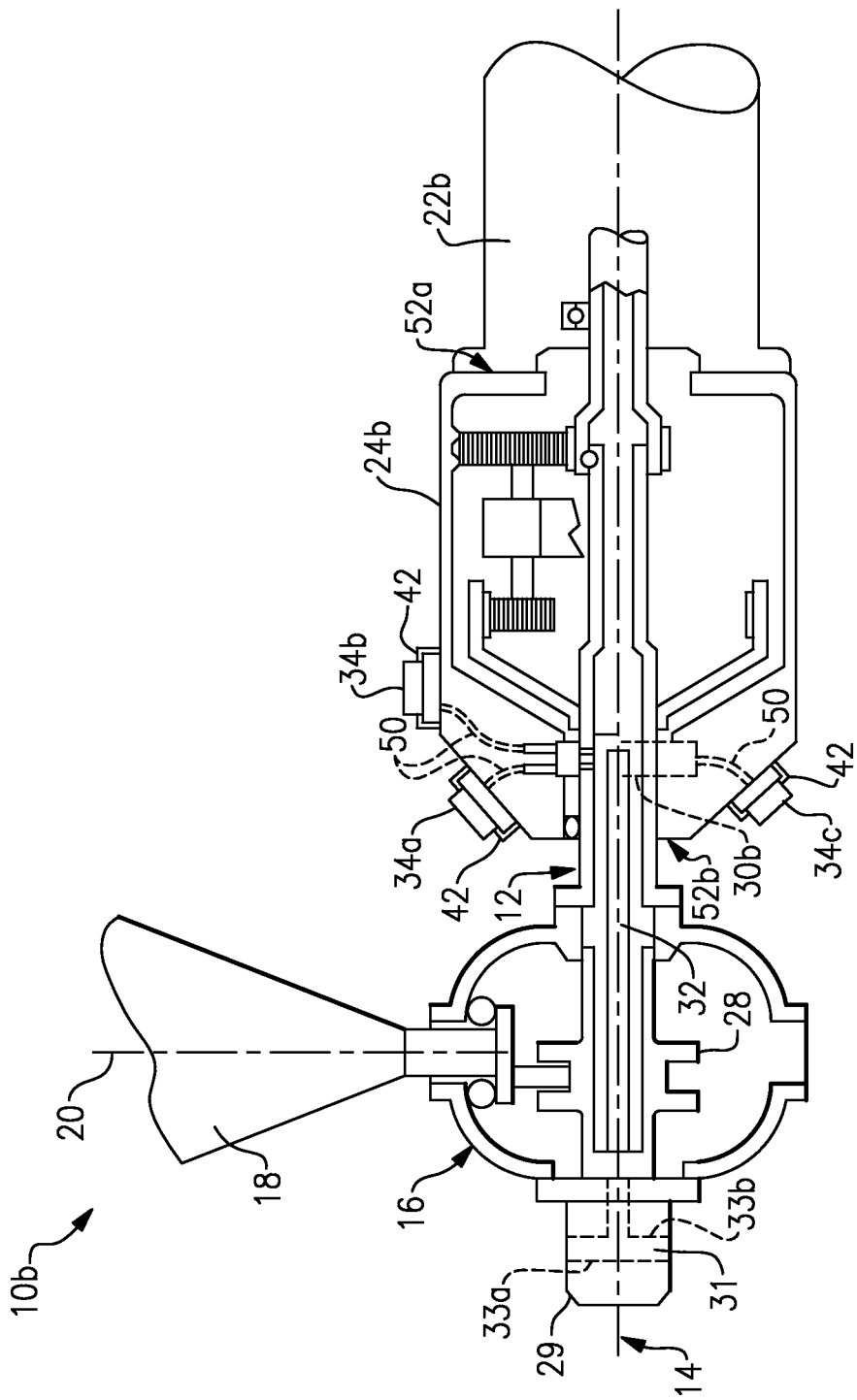
FIG. 2 schematically illustrates a second propeller blade pitch control system including an in-line propeller gearbox.

FIG. 2 schematically illustrates a second propeller blade pitch control system 10b, in which the transfer bearing 30b is located within propeller gearbox 24b at the second, forward end 52b of the gearbox 24b. In the system 10b of FIG. 2, the propeller gearbox 24b is in-line with the axis 14, and is not radially offset as in the system 10a. Thus, in the system 10b the axis 14 extends through both the engine 22b and gearbox 24b. While FIG. 2 schematically illustrates the hydraulic fluid controllers 34a-c being mounted by flanges 42 to the gearbox 24b, it is understood that they could also be located in gearbox cavities 35, as shown in FIG. 1a.

The systems 10a-b are superior to prior art pitch control systems which have located the transfer bearing assembly 30 and hydraulic fluid controllers 34a-c within an envelope volume 40 behind the propeller gearbox 24 (see FIG. 1). In this previous configuration, the envelope volume 40 was difficult to access, which made performance of maintenance tasks difficult. Also, in some aircrafts the envelope volume 40 corresponded to a so-called "fire zone" in which components must be able to withstand temperatures on the order of 2000° F. Locating the transfer bearing within the propeller gearbox 16 prevents the transfer bearing 30 from being located in a fire zone, and makes the transfer bearing 30 easier to access. The new location inside the propeller gearbox 16 also frees up precious space in the envelope volume 40, enabling a reduction in the size of the nacelle housing (not shown), making the systems 10a-b lighter and more aerodynamic. A weight reduction can also be achieved by machining the passages 62, 70 directly into the gearbox 24, instead of requiring separate passages outside of the gearbox.

Although multiple embodiments of this invention have been disclosed, a worker of ordinary skill in this art would recognize that certain modifications would come within the scope of this invention. For that reason, the following claims should be studied to determine the true scope and content of this invention.

What is claimed is:

1. A propeller blade pitch control system comprising:
    a propeller hub for mounting at least one propeller blade;
    a propeller shaft which rotates about an axis to rotationally drive the propeller hub;
    a pitch change yoke located within the propeller hub and configured to change a pitch of the at least one propeller blade in response to hydraulic fluid flow to a pitch change actuator;
    a propeller gearbox including a first, rear end and a second, forward end located between the first, rear end and the pitch change yoke, wherein the propeller gearbox is configured to apply torque to the propeller hub;
    at least one hydraulic flow controller; and
    a hydraulic transfer bearing located between the first, rear end and the second, forward end of the propeller gearbox and operable to selectively permit a flow of hydraulic fluid from the at least one hydraulic flow controller to the pitch change actuator, wherein the hydraulic transfer bearing co-rotates with the propeller shaft.

2. The system of claim 1, wherein the hydraulic transfer bearing is located at the first, rear end of an interior of the propeller gearbox, and is accessible from a removable cover on the first, rear end of the propeller gearbox or from the interior of the propeller gearbox.

3. The system of claim 1, wherein the at least one hydraulic flow controller is configured to transmit hydraulic fluid to the hydraulic transfer bearing, wherein the at least one hydraulic flow controller is configured to be stationary with respect to the propeller shaft.

4. The system of claim 3, wherein the propeller gearbox includes at least one channel for communicating hydraulic fluid from the hydraulic flow controller to the hydraulic transfer bearing.

5. The system of claim 3, including a transfer tube located at least partially within the propeller shaft, and extending along the axis, wherein the hydraulic transfer bearing is fluidly connected with the transfer tube to selectively permit the flow of hydraulic fluid from the at least one hydraulic fluid controller to the pitch change actuator.

6. The system of claim 1, including a hydraulic actuator piston located within the pitch change actuator, wherein the hydraulic actuator piston is attached to the pitch change yoke and is operable to move the pitch change yoke along the axis.

7. The system of claim 6, including an outer transfer tube located at least partially within the propeller shaft, and an inner transfer tube located within the outer transfer tube, the transfer tubes extending along the axis, wherein the hydraulic transfer bearing is fluidly connected with the transfer tubes.

8. The system of claim 7, wherein the inner transfer tube is operable to selectively permit a flow of hydraulic fluid to a first side of the hydraulic actuator piston to move the pitch change yoke to increase the pitch of the at least one propeller blade, and wherein the outer transfer tube is operable to selectively permit the flow of hydraulic fluid to a second side of the hydraulic actuator piston to move the pitch change yoke to decrease the pitch of the at least one propeller blade.

9. The system of claim 1, where the at least one hydraulic fluid controller includes a pump.

10. The system of claim 1, wherein
    at least one hydraulic flow controller, wherein the at least one hydraulic fluid controller includes a propeller control.

11. The system of claim 1, wherein the at least one hydraulic fluid controller is located in at least one cavity in an outer circumference of the propeller gearbox.

12. The system of claim 1, wherein the at least one hydraulic fluid controller is mounted on an external surface of the propeller gearbox.

13. The system of claim 12, wherein the at least one hydraulic fluid controller is mounted on a circumferential surface of the propeller gearbox via a flange connection.

14. The system of claim 1, wherein the pitch change actuator and the propeller gearbox are located on opposing sides of the pitch change yoke.

15. The system of claim 1, wherein hydraulic transfer bearing is located in an interior of the propeller gearbox.

16. The system of claim 1, wherein a gas turbine engine drives rotation of the propeller hub.

17. The system of claim 1, wherein the hydraulic flow controller is located outside of the propeller gearbox.

18. The system of claim 1, wherein the hydraulic flow controller is located inside of the propeller gearbox.

19. The system of claim 1, wherein a portion of the propeller gearbox is radially aligned with the axis.

20. A propeller blade pitch control system comprising:
a propeller hub for mounting at least one propeller blade;
a propeller shaft which rotates about an axis to rotationally drive the propeller hub;
a pitch change yoke located within the propeller hub and configured to change a pitch of the at least one propeller blade in response to hydraulic fluid flow to a pitch change actuator;
a propeller gearbox including a first, rear end and a second, forward end located between the first, rear end and the pitch change yoke, wherein the propeller gearbox is configured to apply torque to the propeller hub, wherein a portion of the propeller gearbox is radially offset from the axis;
at least one hydraulic flow controller; and
a hydraulic transfer bearing located between the first, rear end and the second, forward end of the propeller gearbox and operable to selectively permit a flow of hydraulic fluid from the at least one hydraulic flow controller to the pitch change actuator, wherein the hydraulic transfer bearing is located at the first, rear end of an interior of the propeller gearbox, and is accessible from a removable cover on the first, rear end of the propeller gearbox or from the interior of the propeller gearbox.

21. A propeller blade pitch control system comprising:
a propeller hub for mounting at least one propeller blade;
a propeller shaft which rotates about an axis to rotationally drive the propeller hub;
a pitch change yoke located within the propeller hub and configured to change a pitch of the at least one propeller blade in response to hydraulic fluid flow to a pitch change actuator;
a propeller gearbox including a first, rear end and a second, forward end located between the first, rear end and the pitch change yoke, wherein the propeller gearbox is configured to apply torque to the propeller hub;
at least one hydraulic flow controller; and
a hydraulic transfer bearing located between the first, rear end and the second, forward end of the propeller gearbox and operable to selectively permit a flow of hydraulic fluid from the at least one hydraulic flow controller to the pitch change actuator, wherein the hydraulic transfer bearing is located at the second, forward end of an interior of the propeller gearbox.

22. A propeller blade pitch control system comprising:
a propeller hub for mounting at least one propeller blade;
a propeller shaft which rotates about an axis to rotationally drive the propeller hub;
a pitch change yoke located within the propeller hub and configured to change a pitch of the at least one propeller blade in response to hydraulic fluid flow to a pitch change actuator;
a propeller gearbox including a first, rear end and a second, forward end located between the first, rear end and the pitch change yoke, wherein the propeller gearbox is configured to apply torque to the propeller hub;
at least one hydraulic flow controller;
a hydraulic transfer bearing located between the first, rear end and the second, forward end of the propeller gearbox and operable to selectively permit a flow of hydraulic fluid from the at least one hydraulic flow controller to the pitch change actuator; and
a transfer tube located at least partially within the propeller shaft, and extending along the axis, wherein the hydraulic transfer bearing is fluidly connected with the transfer tube to selectively permit the flow of hydraulic fluid from the at least one hydraulic fluid controller to the pitch change actuator, wherein the transfer tube is concentric with the propeller shaft, and co-rotates with the propeller shaft.

23. A propeller blade pitch control system comprising:
a propeller hub for mounting at least one propeller blade;
a propeller shaft which rotates about an axis to rotationally drive the propeller hub;
a pitch change yoke located within the propeller hub and configured to change a pitch of the at least one propeller blade in response to hydraulic fluid flow to a pitch change actuator;
a propeller gearbox including a first, rear end and a second, forward end located between the first, rear end and the pitch change yoke, wherein the propeller gearbox is configured to apply torque to the propeller hub;
at least one hydraulic flow controller, wherein the at least one hydraulic fluid controller includes a protection unit; and
a hydraulic transfer bearing located between the first, rear end and the second, forward end of the propeller gearbox and operable to selectively permit a flow of hydraulic fluid from the at least one hydraulic flow controller to the pitch change actuator.

\* \* \* \* \*